United States Patent
Liu et al.

(10) Patent No.: US 9,545,741 B2
(45) Date of Patent: Jan. 17, 2017

(54) METHOD OF MAKING A GOLF BALL

(75) Inventors: Chen-Tai Liu, Yun-Lin Hsien (TW); Ying-Kai Wang, Chia-Yi Hsien (TW)

(73) Assignee: NIKE, Inc., Beaverton, OR (US)

( * ) Notice: Subject to any disclaimer, the term of this patent is extended or adjusted under 35 U.S.C. 154(b) by 831 days.

(21) Appl. No.: 13/436,190

(22) Filed: Mar. 30, 2012

(65) Prior Publication Data
US 2013/0256945 A1    Oct. 3, 2013

(51) Int. Cl.
*B29C 45/14* (2006.01)
*B29C 45/27* (2006.01)
*B29L 31/54* (2006.01)
*B29C 33/00* (2006.01)

(52) U.S. Cl.
CPC ..... *B29C 45/14819* (2013.01); *B29C 45/2708* (2013.01); *B29C 33/005* (2013.01); *B29L 2031/546* (2013.01)

(58) Field of Classification Search
CPC ............. B29C 45/2708; B29C 45/14819; B29C 33/005; B29L 2031/546
USPC ...... 264/161, 162, 271.1, 279.1, 320, 328.1, 264/328.8, 328.9; 425/116, 120, 125, 425/129.1, 570, 573
See application file for complete search history.

(56) References Cited

U.S. PATENT DOCUMENTS

| | | | |
|---|---|---|---|
| 3,710,988 A * | 1/1973 | Moslo | 222/404 |
| 5,122,046 A | 6/1992 | Lavallee et al. | |
| 5,407,341 A * | 4/1995 | Endo | B29C 45/26 264/328.9 |
| 5,824,258 A | 10/1998 | Yamaguchi | |
| 5,827,466 A * | 10/1998 | Yamaguchi | 264/279.1 |
| 5,874,038 A | 2/1999 | Kasashima et al. | |
| 6,089,847 A | 7/2000 | Inoue et al. | |
| 6,168,407 B1 | 1/2001 | Kasashima et al. | |
| 6,235,230 B1 | 5/2001 | Puniello | |
| 6,413,464 B1 | 7/2002 | Tanaka | |
| 6,521,161 B1 * | 2/2003 | Tanaka et al. | 264/279.1 |
| 6,561,782 B1 | 5/2003 | Umemoto | |
| 6,756,436 B2 * | 6/2004 | Rajagopalan et al. | 524/322 |
| 7,431,670 B2 * | 10/2008 | Nardacci | A63B 37/0004 473/383 |

(Continued)

FOREIGN PATENT DOCUMENTS

| | | | |
|---|---|---|---|
| JP | 63-141719 | | 6/1988 |
| JP | 63141719 | * | 6/1988 |

(Continued)

OTHER PUBLICATIONS

Office Action from corresponding Japanese Patent Application No. 2013-066459.

*Primary Examiner* — Edmund Lee
(74) *Attorney, Agent, or Firm* — Honigman Miller Schwartz and Cohn LLP (57) ABSTRACT

The disclosure provides a method of making a golf ball with a reduced gate defect. The method may include using a mold that has a mold cavity with a mold chamber with a surface and a parting edge disposed along the perimeter of mold chamber. At least one gate may be disposed on the parting edge to provide a path for a cover material to be injected into the mold chamber. The gate may include a flat middle surface connected by a first side surface and a second side surface disposed opposite the first side surface. A round having a radius of curvature ranging from about 0.2 mm to about 0.5 mm may be disposed along a middle gate edge of middle surface and/or a side gate edge of one of the first side surface and the second side surface.

22 Claims, 9 Drawing Sheets

(56) References Cited

U.S. PATENT DOCUMENTS

| | | | |
|---|---|---|---|
| 7,520,824 B2 | 4/2009 | Kasashima | |
| 7,604,767 B2 * | 10/2009 | Nagashima | B29C 45/2708 264/328.1 |
| 7,618,333 B2 * | 11/2009 | Nardacci et al. | 473/383 |
| 8,083,977 B2 | 12/2011 | Nakagawa et al. | |
| 8,193,296 B2 | 6/2012 | Ishii et al. | |
| 8,414,428 B2 * | 4/2013 | Aoyama | A63B 37/0004 473/383 |
| 2001/0048180 A1 | 12/2001 | Cupples | |
| 2005/0209026 A1 * | 9/2005 | Higuchi et al. | 473/374 |
| 2010/0167846 A1 | 7/2010 | Hirau et al. | |
| 2010/0197428 A1 * | 8/2010 | Aoyama | A63B 37/0004 473/379 |
| 2011/0130216 A1 | 6/2011 | Kim et al. | |
| 2011/0160002 A1 | 6/2011 | Nakagawa et al. | |
| 2012/0046127 A1 | 2/2012 | Ichikawa et al. | |

FOREIGN PATENT DOCUMENTS

| | | | |
|---|---|---|---|
| JP | 10127826 | | 5/1998 |
| JP | 2000185116 | A | 7/2000 |
| JP | 2002048904 | A | 2/2002 |
| JP | 2006062111 | A | 3/2006 |
| JP | 4120701 | * | 7/2008 |
| JP | 2009051168 | A | 3/2009 |
| JP | 2011136166 | A | 7/2011 |
| JP | 2012011171 | A | 1/2012 |
| JP | 2012045382 | A | 3/2012 |
| JP | 05016248 | B2 | 9/2012 |

* cited by examiner

METHOD OF MAKING A GOLF BALL

BACKGROUND

The present disclosure relates generally to an injection mold for injection molding an article. In particular, the disclosure relates to an injection mold for molding a golf ball.

The game of golf is an increasingly popular sport at both amateur and professional levels. A wide range of technologies related to the manufacture and design of golf balls are known in the art. For instance, a method of manufacturing golf balls involves injection molding layers of the golf ball. This method achieves a layer shaped like the mold. To inject material into the mold, the mold contains gates through which hot material flows. As the material cools, the material hardens inside the mold, as well as between the molds around the equator of the ball where the gates are located and inside the gates. As a result, the molded layer of the golf ball includes flash line around the equator of the ball and gate runners where the gates were located. To make the outer surface of the golf ball have a uniform finish, the flash line and gate runners are removed through grinding, buffing, and other processes. However, even after these removal processes, a gate mark is still visible where the gate runners were located. A gate mark defect rate may be determined by human or automated inspection of 100 or 1,000 golf balls. If there are more than 4 gate marks or there is a single deep gate mark, both by a predetermined standard, then it is counted as a defective ball. It would be advantageous to be able to mold a golf ball with a reduced gate mark defect.

SUMMARY

A method of making a golf ball is disclosed. The golf ball produced by the method may have a reduced gate defect. The method of making the golf ball may include injection molding a cover layer on a golf ball core and/or an inner cover layer. The mold used for injection molding may have special features that help reduce the gate defect of the golf ball.

In one aspect, the disclosure provides a method of making a golf ball that may include the step of providing a golf ball mold including a first mold cavity and a second mold cavity configured to mate with the first mold cavity. The first mold cavity may have a first mold chamber and a first parting edge disposed along the perimeter of first mold chamber. The first gate may be disposed on the first parting edge. The first gate may provide a path for a cover material to be injected into the first mold chamber and may have a first edge forming a first round between the first edge and the first mold chamber. The method may include forming a golf ball core and placing the golf ball core between the first mold cavity and the second mold cavity. The method may also include mating the first mold cavity and the second mold cavity together. The method may include injecting a golf ball cover material into the first mold cavity and the second mold cavity. The step of injecting a golf ball cover material into the first mold cavity and the second mold cavity may include injecting the golf ball cover material through the gates of the first mold cavity. The first round of the first gate may include a radius of curvature ranging from about 0.2 mm to about 0.5 mm. The path may have a substantially rectangular cross-section. The path may have a cross-sectional area ranging from about 0.3 mm$^2$ to about 2 mm$^2$. The substantially rectangular cross-section may have a vertical height ranging from about 0.3 mm to about 1.5 mm. The cross-section of the first gate may include at least one fillet. The at least one fillet may include a radius of curvature ranging from about 0.2 mm to about 0.5 mm.

The first gate may include a flat middle surface connected by a first side surface and a second side surface disposed opposite the first side surface. The middle surface, first side surface, and second side surface may together form a substantially u-shaped cross-section. The golf ball cover material may include a thermoplastic polyurethane. The golf ball cover material may include a crosslinked thermoplastic polyurethane elastomer. The method may further include forming an inner cover layer enclosing the core, wherein the inner cover layer has a surface Shore D hardness of at least 65. The step of forming a golf ball core may include injection molding an inner core layer and compression molding an outer core layer around the inner core layer. The inner core layer may include a highly neutralized acid polymer composition. The second mold cavity may have a second mold chamber and a second parting edge disposed along the perimeter of second mold chamber. A second gate may be disposed on the second parting edge. The second gate may provide a path for a cover material to be injected into the second mold chamber and may have a second edge forming a second round between the second edge and the second mold chamber. The first parting edge may include 9 gates, the second parting edge may include 9 gates, and when the first parting edge is aligned with the second parting edge, 18 paths may be disposed between the first parting edge and the second parting edge.

In another aspect, the disclosure provides a method of making a golf ball. The method may include the step of providing a golf ball mold. The golf ball mold may include a first mold cavity having a first mold chamber including a first parting edge disposed along the perimeter of the first mold chamber and a first gate disposed on the first parting edge. The golf ball mold may further include a second mold cavity having a second mold chamber including a second parting edge disposed along the perimeter of the second mold chamber and a second gate disposed on the second parting edge. The second parting edge may have a shape corresponding to the first parting edge such that the first mold cavity may be mated with the second mold cavity. The method may include forming a golf ball core. The golf ball core may include a thermoplastic material. The method may include placing the golf ball core between the first mold cavity and the second mold cavity. The method may further include mating the first parting edge with the second parting edge. When mating the two parting edges, the first gate may align with a portion of the second parting edge to provide a first path for a cover material to be injected into the first mold cavity and the second mold cavity. Similarly, the second gate may align with a portion of first parting edge to provide a second path for the cover material to be injected into the first mold cavity and the second mold cavity. The method may include injecting a golf ball cover material having a flexural modulus of from 200 psi to 1,000 psi into the first mold cavity and the second mold cavity. The step of injecting a golf ball cover material into the first mold cavity and the second mold cavity may include injecting the golf ball cover material through the first gate and the second gate. The first path may have a substantially rectangular cross-section. The second path may have a substantially rectangular cross-section. The first path may be vertically offset from the second path.

In another aspect, the disclosure provides a method of making a golf ball. The method may include the step of providing a golf ball mold. The golf ball mold may include a first mold cavity having a first mold chamber including a first parting edge disposed along the perimeter of the first mold chamber and a first gate disposed on the first parting edge. The golf ball mold may further include a second mold cavity having a second mold chamber including a second parting edge disposed along the perimeter of the second mold chamber and a second gate disposed on the second parting edge. The first parting edge and the second parting edge may both have wavy surfaces that correspond such that the first mold cavity may be mated with the second mold cavity along the first parting surface and the second parting surface. The method may include forming a golf ball core. The method may include placing the golf ball core between the first mold cavity and the second mold cavity. The method may further include mating the first mold cavity and the second mold cavity together. The method may include injecting a golf ball cover material into the first mold cavity and the second mold cavity. When the first parting edge mates with the second parting edge, the first gate may align with a portion of second parting edge to provide a first path for a cover material to be injected into the first mold chamber. The portion of the second parting edge that aligns with the first gate may be concave such that the portion of the second parting edge bows outwardly away from the first gate. The step of forming a golf ball core may include injection molding an inner core layer. The step of forming a golf ball core may include compression molding an outer core layer around the inner core layer. The first path may have a substantially rectangular cross-section. The path may have a cross-sectional area ranging from about 0.3 mm$^2$ to about 2 mm$^2$.

The substantially rectangular cross-section may have a vertical height ranging from about 0.3 mm to about 1.5 mm. The step of forming a golf ball core may include compression molding an outer core layer around the inner core layer. The outer core layer may have a surface Shore D hardness that is higher than the surface hardness of the inner core layer by at least about 5. The first parting edge may include 9 gates, the second parting edge may include 9 gates, and when the first parting edge is aligned with the second parting edge, 18 paths may be disposed between the first parting edge and the second parting edge. The first gate may have a first edge forming a first round between the first edge and the first mold chamber. The first round may include a radius of curvature ranging from about 0.2 mm to about 0.5 mm.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

A method of making a golf ball is disclosed. The golf ball produced by the method may have a reduced gate defect. Golf balls typically include a core substantially surrounded by one or more layers. For example, a golf ball may be of a two-piece construction, having only a core and a cover layer, or a golf ball may have one or more intermediate layers located between the core and the cover layer. Golf balls within the scope of this disclosure may be of a two-piece construction, or may have additional intermediate layers between the core and cover layer. The disclosed method may be used to form golf balls of all types.

Figure 1:
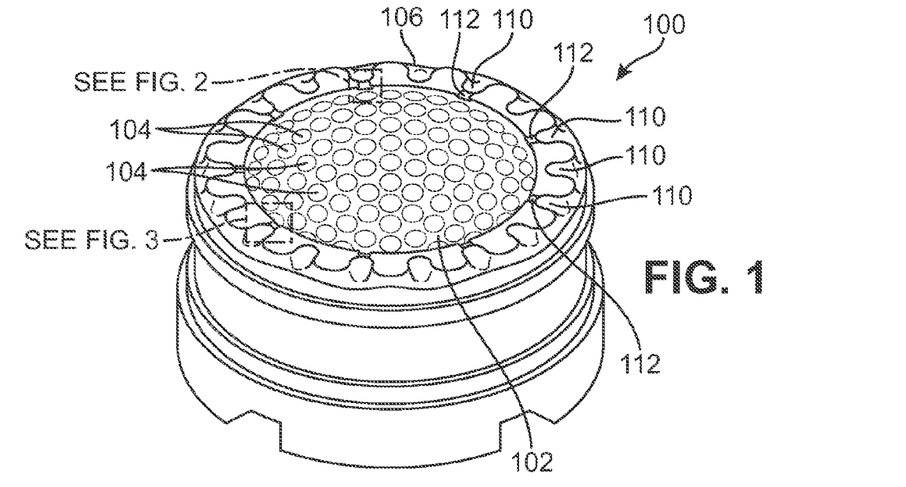
FIG. 1 is a perspective view of a golf ball mold cavity according to an embodiment.
Figure 3:
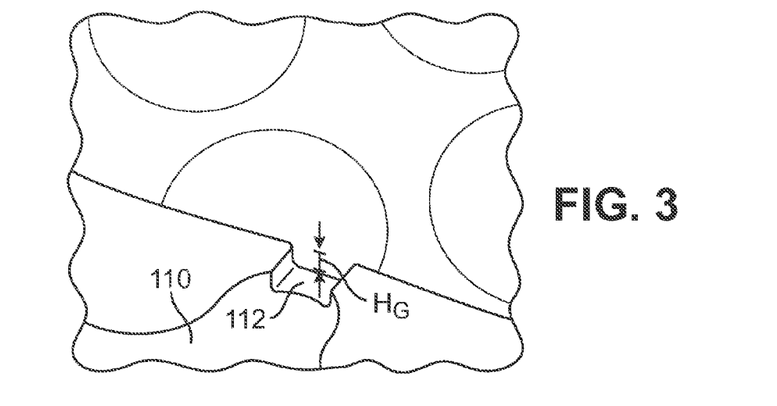
FIG. 3 is a zoomed in view of a portion of FIG. 1.
Figure 4:
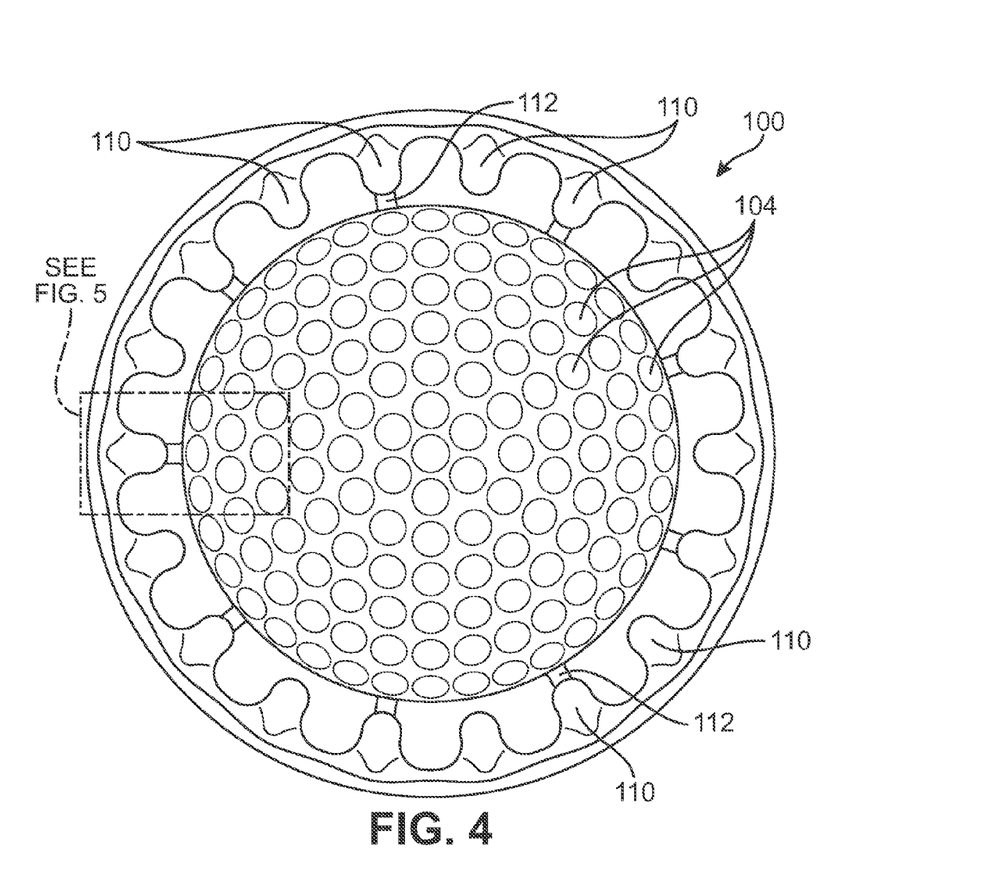
FIG. 4 is a top plan view of the golf ball mold cavity according to the embodiment shown in FIG. 1.

The method may include injection molding cover layer material around a core and/or inner cover layers. The cover layer material may include a polymer, such as a thermoplastic, elastomeric, or thermosetting material. To perform the disclosed method, a golf ball mold may be used. FIGS. 1-7 show a golf ball mold cavity 100 according to an embodiment. FIG. 1 is a perspective view of mold cavity 100 and FIG. 4 is a top plan view of mold cavity 100. Mold cavity 100 may have a mold chamber 102 and a parting edge 106. Mold chamber 102 may have an inverse hemispherical shape corresponding to the general shape of half of a golf ball. Multiple protrusions 104 may be dispersed about the surface of mold chamber 102. Protrusions 104 of mold chamber 102 may correspond to dimples formed on the cover layer of golf balls. The plurality of protrusions may generally be arranged so that the dimples form on the cover layer in any pattern, as may be known in the art of golf balls. For example, golf ball dimple patterns generally may be based upon dividing the spherical surface of the ball into discrete polygonal surfaces. The edges of the surfaces may join to form geometric shapes that approximate the spherical surface of a golf ball. These geometric shapes may include, for example, regular octahedral, regular icosahedral and regular polyhedral arrangements. Once a geometric shape is selected, the polyhedral surfaces may be individually filled with a dimple pattern that may be repeated over the surface. Dimples may generally be of any shape, such as circular, triangular, or multi-sided. The size of the dimples may vary. In one embodiment, the dimple diameter is between about 1 mm to about 5 mm. The depth of the dimples may also vary based on desired flight performance. In one embodiment, the dimple depth is between about 0.1 mm to about 0.3 mm. Dimples may be of uniform shape and size, or the dimple pattern may be made up of two or more different types of dimples having, for example, different sizes or different shapes. In some embodiments, mold cavity 100 may include multiple mold chambers to mold multiple golf ball cover layers simultaneously.

Mold cavity 100 may have ports 110 disposed on parting edge 106 and gates 112 adjacent every other port 110 on parting edge 106. Gates 112 may be disposed between every other port 110 and mold chamber 102. Ports 110 and gates 112 may provide a fluid path from a source of cover layer material to mold chamber 102.

Figure 6:
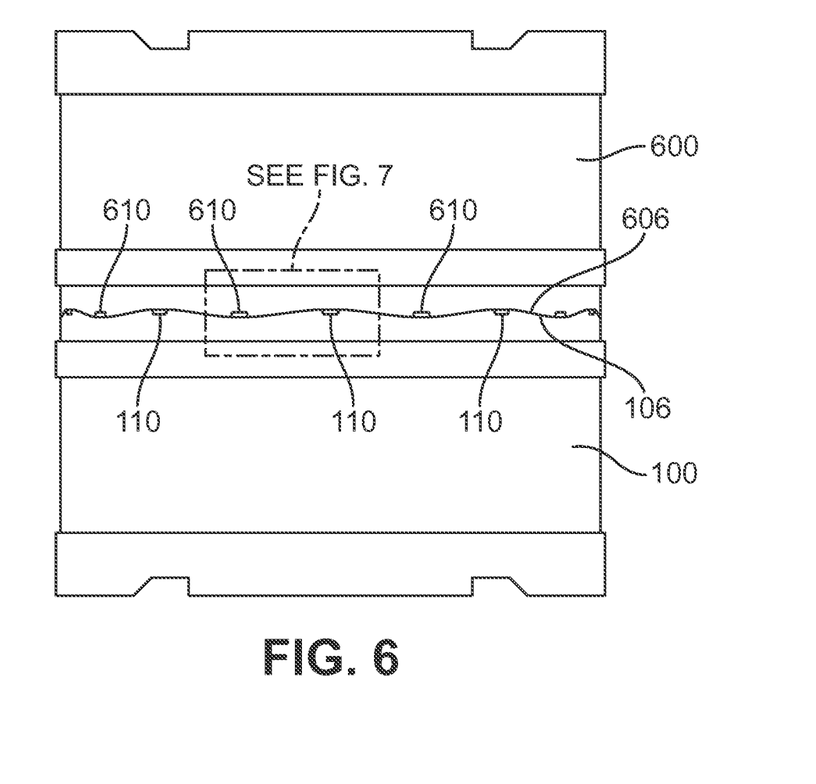
FIG. 6 is a side elevation view of the golf ball mold cavity according to the embodiment shown in FIG. 1 pressed together with a correspondingly shaped golf ball mold cavity.
Figure 7:
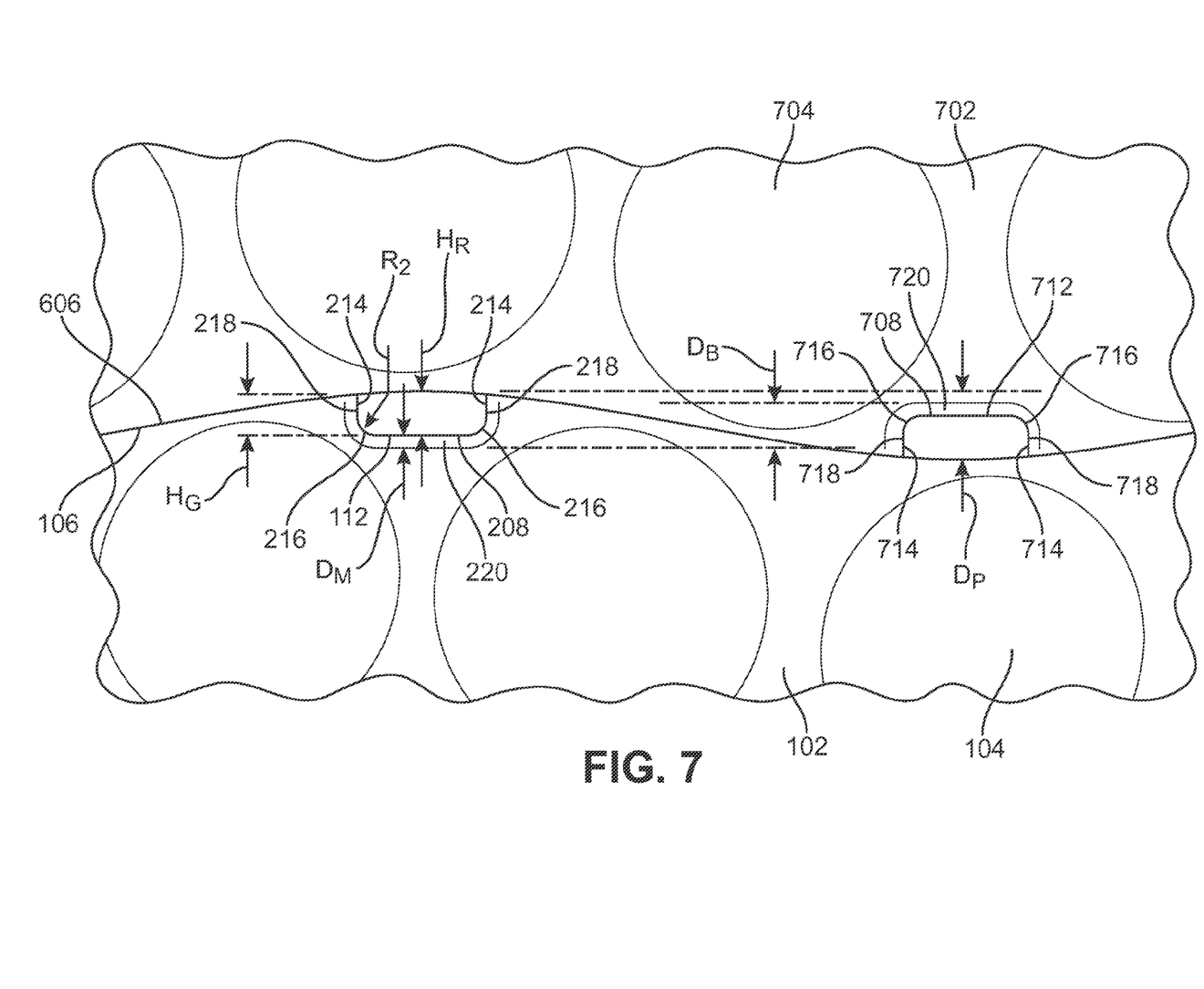
FIG. 7 is a zoomed in view of the inside of the mold cavities mated together as shown in FIG. 6.

In some embodiments, a golf ball cover layer may be formed by placing a golf ball core between multiple golf ball molds. For example, FIGS. 6 and 7 show how mold cavity 100 may be pressed together with a second mold cavity 600 shaped to compliment mold cavity 100. Together, mold cavity 100 and mold cavity 600 may constitute a golf ball mold. In some embodiments, the golf ball mold may include more than two cavities that together form a golf ball mold. For example, mold cavity 100 may be divided into two mold cavities and/or mold cavity 600 may be divided into two mold cavities. Thus, in such embodiments, the golf ball mold would be made up of three or four mold cavities. In some embodiments, a core may be placed between mold cavity 100 and mold cavity 600. Mold cavity 600 may have a mold chamber 702, parting edge 606, ports 610, and gates 712 corresponding to mold chamber 102, parting edge 106, ports 110, and gates 112, respectively. In embodiments where mold cavity 100 has multiple mold chambers, mold cavity 600 may have multiple corresponding mold chambers to mold multiple golf ball cover layers simultaneously. In embodiments where the golf ball mold is made up of more than two mold cavities, a core may be placed between the mold cavities such that the mold cavities can enclose the core.

Mold cavity 100 and mold cavity 600 may be pressed together to enclose the core within mold chambers. When mold cavity is pressed together with mold cavity 600, the ports may be aligned such that ports 110 and ports 610 together form larger ports through which cover material may flow. FIG. 7 is a zoomed in view of the inside of the mold cavities mated together as shown in FIG. 6. FIG. 7 shows how gates 112 may align with a portion of parting edge 606 to form substantially rectangular openings. Similarly, gates 712 may align with a portion of parting edge 106 to form substantially rectangular openings. Each larger port may be in communication with a substantially rectangular opening such that fluid may flow from the larger port through the substantially rectangular opening into mold chamber 102. In some embodiments, retractable pins may be provided within the mold chambers to support the core so that a space may be maintained between the core and the inner walls of the mold chambers. Cover layer material may be injected into the spaces between one or more of ports 110 and ports 610. The cover layer material may flow from ports to the mold chambers via one or more of gates 112 and gates 712. The cover layer material may fill the space between the core and the mold chambers. As the material cools, it may set and form a cover layer around the core.

Figure 2:
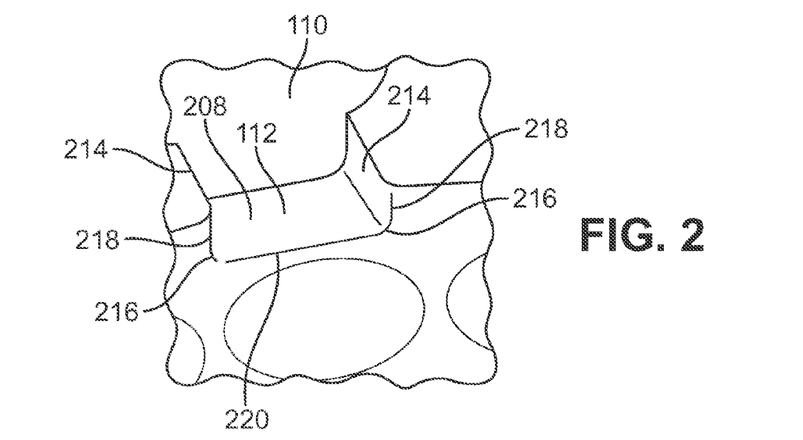
FIG. 2 is a zoomed in view of a portion of FIG. 1.
Figure 5:
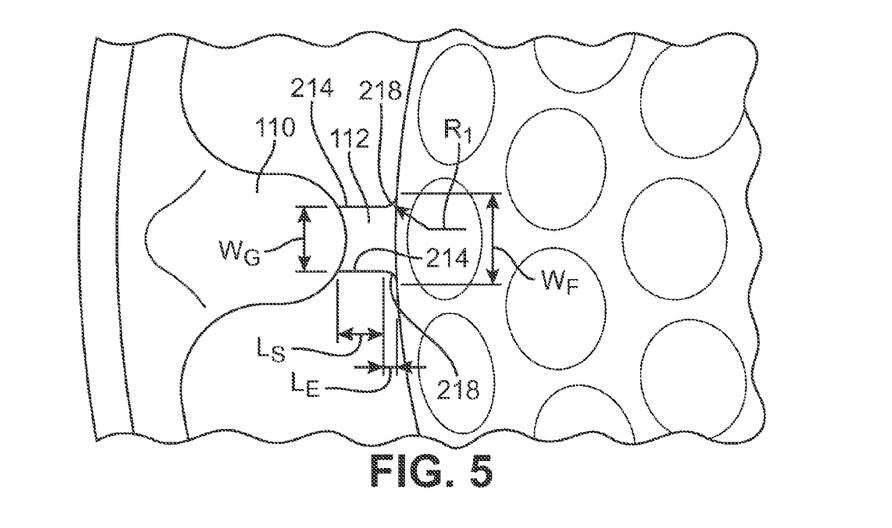
FIG. 5 is a zoomed in view of a portion of FIG. 4.

FIG. 2 is a zoomed in view of a portion of FIG. 1 including one of the gates. FIG. 3 is a zoomed in view of a portion of FIG. 1 including another one of the gates. FIG. 5 is a zoomed in view of a portion of FIG. 4 including one of the ports and one of the gates. In some embodiments, ports 110 may be defined as sunken areas of parting edge 106 that taper in width toward gates 112. The size and shape of ports 110 may be selected based on a variety of factors. For example, the size and shape of ports 110 may be selected based on the temperature of the mold cavities, the material used in the injection molding process, and/or the dimensions of gates 112. Ports 110 may be configured to direct material from the outer region of parting edge 106 to and through gates 112. In some embodiments, ports 610 may have a different size and/or shape than ports 110. In some embodiments, for example, as shown in FIGS. 6-7, ports 610 may have the same size and shape as ports 110.

Gates 112 may have a substantially u-shaped cross-section. In some embodiments, gates 112 may have two side surfaces 214 disposed opposite one another and a middle surface 208 disposed between two side surfaces 214. In some embodiments, middle surface 208 may connect side surfaces 214 at corners 216. In some embodiments, side surfaces 214 may be substantially flat. Middle surface 208 may be substantially flat. In some embodiments, side surfaces 214 may meet mold chamber 102 at side gate edges 218. Middle surface 208 may meet mold chamber 102 at middle gate edge 220. In some embodiments, side surfaces 214 and middle surface 208 may each include a round, or rounded exterior corner, where gates 112 meet mold chamber 102. For example, as shown in FIG. 5, side gate edges 218 may be rounded with a radius of curvature $R_1$ from about 0.2 mm to about 0.5 mm. In some embodiments, middle gate edge 220 may be rounded with a radius of curvature $R_1$ from about 0.2 mm to about 0.5 mm. As shown in FIG. 7, the vertical distance $D_M$ between middle surface 208 and the bottommost point of middle gate edge 220 may range from about 0.2 mm to about 0.5 mm. In some embodiments, corners 216 of gates 112 may be rounded to form a fillet, or a rounded interior corner. For example, as shown in FIG. 7, corners 216 may form a fillet with a radius of curvature $R_2$ from about 0.2 mm to about 0.5 mm. The rounding of the gate corners and/or edges may help disperse stress in the cover material already disposed in the mold during injection.

In some embodiments, as shown in FIG. 3, gates 112 may have a height $H_G$ that ranges from about 0.3 mm to about 1.0 mm. In some embodiments, as shown in FIG. 5, gates 112 may have a width $W_G$ along side surfaces 214. $W_G$ may range from about 1.0 mm to about 2.0 mm. In some embodiments, as shown in FIG. 5, the width of gates 112 may expand along gate edges 218 to a final width $W_F$ ranging from about 1.5 mm to about 2.5 mm. In some embodiments, as shown in FIG. 5, side surfaces 214 may have a length $L_S$ ranging from about 0.5 mm to about 1.5 mm. In some embodiments, as shown in FIG. 5, side gate edges 218 may have a length $L_E$ ranging from about 0.2 mm to about 0.5 mm. The entire length of gates 112 may include the sum of length $L_S$ and length $L_E$.

In some embodiments, gates may have a different size and/or shape from gates 112. In some embodiments, for example, as shown in FIG. 7, gates 712 may have the same size and shape as gates 112. Gates 712 may have side surfaces 714 and a middle surface 708. Middle surface 708 may connect side surfaces 714 at corners 716. In some embodiments, side surfaces 714 may meet a mold chamber 702 of mold cavity 600 at side gate edges 718. Middle surface 708 may meet mold chamber 702 at middle gate edge 720.

The size and shape of gates 112 and/or gates 712 may be selected based on a variety of factors. For example, the size and shape of gates 112 and/or gates 712 may be selected based on the temperature of the mold cavities, the material used in the injection molding process, and/or the dimensions of the land areas disposed between protrusions 104. In some embodiments, gates 112 and/or gates 712 may be configured to lie flat on the land areas disposed between protrusions 104. In some embodiments, gates 112 and/or 712 may have a substantially rectangular cross-section to provide a cross-section with a sufficient area for material to flow through while keeping the dimensions of the substantially rectangular cross-section small enough to fit on the land areas disposed between protrusions 104 and/or protrusions 704. For example, the height $H_G$ may be selected to be sufficiently small to fit between protrusions 104. To provide a cross-section having an area that is sufficiently large for efficient injection of material, width $W_G$ and width $W_F$ may be selected to be sufficiently large to compensate for a smaller height $H_G$. In some embodiments, the length of the gates may be selected to be sufficiently long for a trimming station to trim gate runners from golf balls after molding. In some embodiments, the length of the gates may be selected to be sufficiently short to prevent material from cooling and hardening too quickly.

In some embodiments, as shown in FIG. 7, parting edge 106 may have a wavy surface and parting edge 606 may have a surface with a corresponding shape such that the two parting edges may mate together. Each wave of first parting edge 106 and parting edge 606 may have a peak. As mentioned above, gates 112 may align with a portion of parting edge 606 to form substantially rectangular openings, or paths, and gates 712 may align with a portion of parting edge 106 to form substantially rectangular openings, or paths. As shown in FIG. 7, the portions of the parting edges that align with the gates may be concave such that the portions of the parting edges bow outwardly away from the gates. The substantially rectangular openings may have a height $H_R$ ranging from about 0.3 mm to about 1.5 mm or from 0.3 mm to 0.8 mm. The substantially rectangular openings may have a cross-sectional area ranging from about 0.3 mm$^2$ to about 2 mm$^2$. The wave of parting edge 106 and/or parting edge 606 may cause $H_R$ to be slightly larger than $H_G$. For example, in some embodiments, $H_R$ may be about 0.01 mm to about 0.5 mm larger than $H_G$. When mold cavity 100 and mold cavity 600 are placed together, as shown in FIGS. 6 and 7, gates 112 may face a first direction and gates 712 may face a second direction that is opposite the first direction. By having a first portion of the gates on one mold cavity and a second portion of the gates on another mold cavity, protrusions may be more closely spaced from one another near the parting edges. In other words, this configuration may provide more flexibility with designing protrusions.

The substantially rectangular openings formed by gates 112 may be vertically offset from the substantially rectangular openings formed by gates 712. The wave of parting edge 106 and/or parting edge 606 may cause this offset to be smaller than if the parting edges were completely flat. The size and shape of the wave may be selected based upon a variety of factors. For example, the size and shape of the wave may be selected based upon the size and/or shape of the gates, the size and/or shape of the mold chambers, and/or the size, shape, and/or position of the protrusions. In some embodiments, the size and/or shape of the wave may be selected to be sufficiently small such that flash lines created during the molding process are not difficult to remove. In some embodiments, the distance $D_B$ between the bottommost point of middle gate edge 220 and the bottommost point of middle gate edge 720 may range from about 0.1 mm to about 1.0 mm. In some embodiments, $H_R$ may be from about 0.01 mm to about 0.5 mm larger than the $D_B$. In some embodiments, the distance $D_P$ between a peak of parting edge 106 and a peak of parting edge 606 may range from about 0.5 mm to about 2.0 mm. In some embodiments, the distance $D_P$ between a peak of parting edge 106 and a peak of parting edge 606 may range from about 0.5 mm to about 1.0 mm. In some embodiments, $D_P$ may be from about 0.05 mm to about 0.5 mm larger than the sum of $D_M$ and $H_R$.

While FIGS. 1 and 4 show mold cavity 100 having 18 ports 110 and 9 gates 112, the number of ports and/or gates may vary. For example, mold cavity 100 may include from about 10 ports to about 24 ports and from about 5 gates to about 12 gates. The number of ports and/or gates may be selected based on a variety of factors. For example, the number of ports and/or gates may be selected based on the temperature of the mold cavities, the material used in the injection molding process, and/or the dimensions of the mold cavities. Increasing the number of gates may allow for the gates to have smaller cross-sectional dimensions, which may reduce the size of the gate runner left by material hardening in the gates during injection molding. Furthermore, reducing the size of the cross-sectional dimensions of the gates may create a higher pressure for injection of material through gates.

Table 1 shows the results of tests performed on test molds, which include example molds prepared according to the present disclosure and comparative examples of molds with different gate shapes and dimensions. The comparative examples include test results from molds made during development. The golf ball molds according to the present disclosure include Examples A and B, gate details of which are shown in Table 1. The comparative examples of molds with different gate shapes and dimensions include Comparative Examples C, D, E, and F, gate details of which are shown in Table 1. In Table 1, "Opening Shape" means the shape of the opening created by a gate and an edge aligned with the gate when the golf ball mold is assembled. In Table 1, "Opening Total Height" means the total height of the opening created by a gate and an edge aligned with the gate. The "Radius of the Round" means the radius of the round disposed along edges formed between the gates and the mold chambers of the molds. The molds were tested by using the molds to create a cover layer around cores or inner balls having a diameter of 40.5 mm. A cover material with the composition shown in Table 2 was injection-molded using a traditional injection machine with a temperature of about 215° C. to 230° C. The amounts of the materials are shown in Table 2 in parts by weight (pbw) or percentages by weight. PTMEG is polytetramethylene ether glycol, having a number average molecular weight of 2,000. PTMEG is commercially available from INVISTA, under the trade name of TERATHANE®. BG is 1,4-butanediol, commercially available from BASF Corporation and other suppliers. TMPMP is trimethylolpropane monoallyl ether, commercially available from Perstorp Specialty Chemicals AB. DCP is dicumyl peroxide. MDI is diphenylmethane diisocyanate, commercially available from Hunstman International LLC, under the trade name Suprasec® 1100. The cover material was formed by mixing PTMEG, BG, TMPME, DCP, and MDI in the proportions shown. Specifically, these materials were prepared by mixing the components in a high agitated stir for 1 minute, starting at a temperature of about 70° C., followed by a 10-hour post curing process at a temperature of about 100° C. The post cured polyurethane elastomers were ground into small chips.

For each mold, 1,000 balls were made. The defect rate of gate marks, listed in Table 1, was determined by human inspection of 1,000 golf balls. If there are more than 4 gate marks or there is 1 deep gate mark, both by a predetermined standard, then the ball is counted as a defective ball. As demonstrated by the test data, the molds prepared according to the present disclosure had lower gate mark defect rates than those of the comparative examples of molds.

TABLE 1

TEST DATA FOR GOLF BALL MOLDS

| | Examples | | | Comparative Examples | | |
|---|---|---|---|---|---|---|
| Mold | A | B | C | D | E | F |
| Gate number | 18 | 12 | 18 | 12 | 18 | 12 |
| Opening shape | Substantially Rectangular | Substantially Rectangular | Substantially Rectangular | Substantially Rectangular | Semicircular | Semicircular |
| Opening total height (mm) | 0.74 | 0.74 | 0.74 | 0.74 | 0.96 | 0.96 |
| Radius of round (mm) | 0.3 | 0.3 | 0.1 | 0.1 | 0.1 | 0.1 |
| Gate mark defect rate | 0.3% | 0.4% | 6% | 8% | 15% | 21% |

TABLE 2

COVER MATERIALS USED IN TESTING

| | A |
|---|---|
| PTMEG (pbw) | 100 |
| BG (pbw) | 15 |
| TMPME (weight % to total components) | 10% |
| DCP (weight % to total components) | 0.5% |
| MDI (pbw) | 87.8 |
| (NCO index) | 1.01 |

Figure 8:
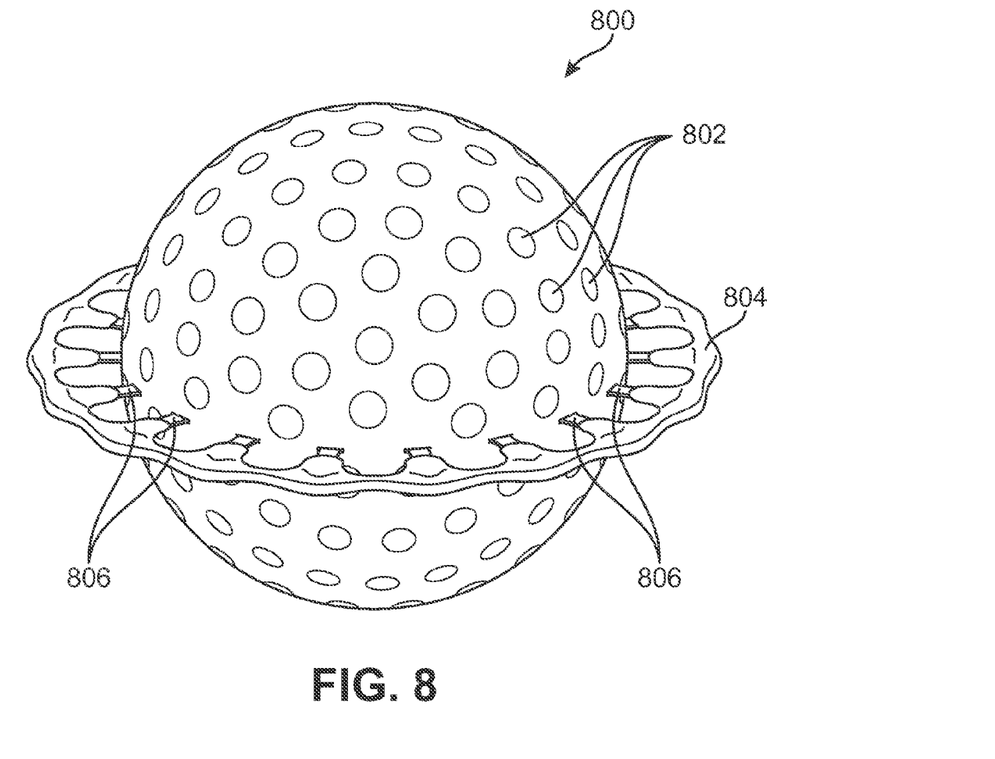
FIG. 8 is a perspective view of a golf ball according to an embodiment.

FIGS. 8-12 show an exemplary golf ball 800 as it appears after mold cavity 100 and mold cavity 600 are used to mold a cover layer around a core. FIG. 8 is a perspective view of a golf ball according to an embodiment. Dimples 802 on golf ball 800 may correspond with protrusions 104 of mold chamber 102 and protrusions 704 of mold chamber 702. Golf ball 800 may include a ring runner 804 and gate runners 806. Ring runner 804 may be formed when molten materials flow through runners to ports 110 and gates 112 during the molding process. Gate runners 806 may be a byproduct formed by gates 112 and gates 712 during the molding process. Gate runners 806 may have substantially the same size and shape as gates 112 and gates 712. In some embodiments, golf ball 800 may include a flash line (not shown) disposed about the equator of the ball where parting line 106 and parting line 606 met during molding.

After the cover layer is molded, to make the outer surface of the golf ball have a uniform finish, ring runner 804, gate runners 806, and the flash line may be removed through trimming, grinding, buffing, and/or other processes. Golf ball 800 may then undergo finishing work. For example, golf ball 800 may be sprayed with a protective coating or a coating that imparts aerodynamic properties to golf ball 800. These coating materials may be liquid when they are applied to the ball. Ball 800 may be stationary or may be spinning before, during, and/or after the coating material is applied to golf ball 800. Golf ball 800 may also undergo surface treatment and/or stamping process before the protective coating is applied to the ball surface.

Figure 9:
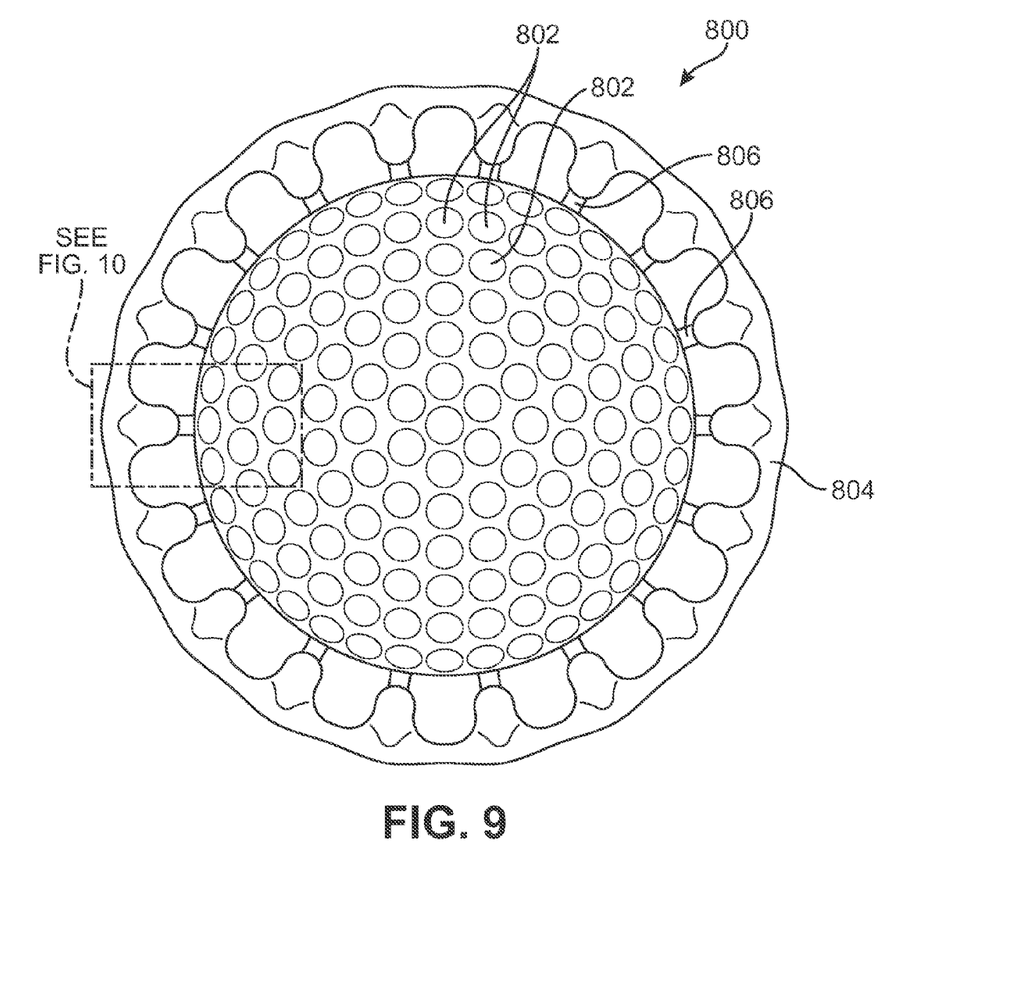
FIG. 9 is a top plan view of the golf ball according to the embodiment of FIG. 8.
Figure 10:
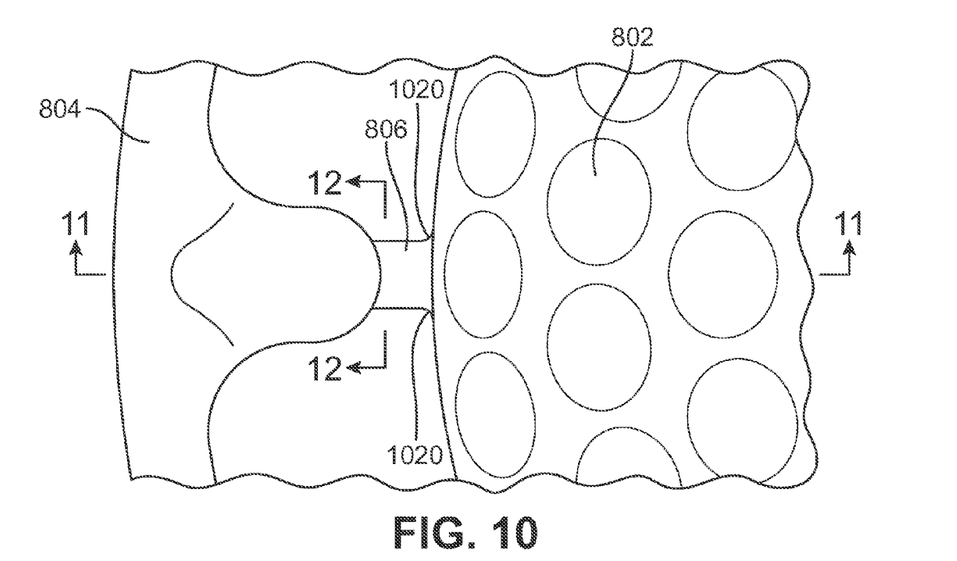
FIG. 10 is a zoomed in view of a portion of FIG. 9.
Figure 11:
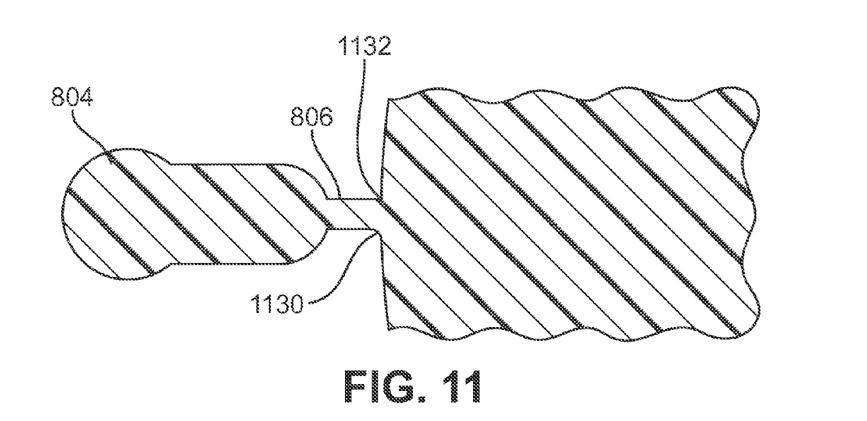
FIG. 11 is a cross sectional view of FIG. 10.

FIG. 9 is a top plan view of the golf ball according to the embodiment of FIG. 8. FIG. 10 is a zoomed in view of a portion of FIG. 9. Gate runners 806 may have rounded portions 1020 that form fillets where gate runners 806 meet golf ball 800. Rounded portions 1020 may be formed by side gate edges 218 during molding. FIG. 11 is a cross sectional view of FIG. 10. Gate runners 806 may have rounded portions 1130 that form fillets where gate runners 806 meet golf ball 800. Rounded portions 1130 may be formed by middle gate edge 218 during molding. Gate runners 806 may have an edge 1132 where gate runners 806 meet golf ball 800 on the side opposite rounded portions 1130. In some embodiments, the portions of parting edge 606 that are opposite gates 112 may be rounded adjacent mold chamber 602 in the same manner that middle gate edge 220 may be rounded. Similarly, the portions of parting edge 106 that are opposite gates 712 may be rounded adjacent mold chamber 102 in the same manner that middle gate edge 720 may be rounded. In such embodiments, edges 1132 may be rounded in the same manner as rounded portions 1130.

Figure 12:
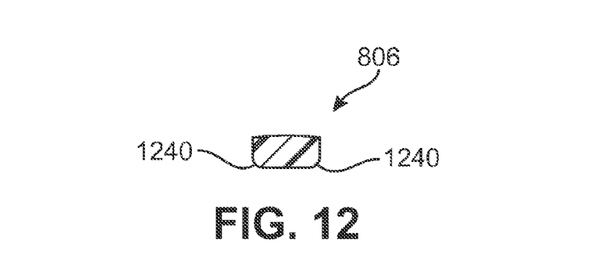
FIG. 12 is a cross sectional view of FIG. 11.

FIG. 12 is a cross sectional view of FIG. 11. Gate runners 806 may include rounded portions 1240 forming rounds. Rounded portions 1020 may be formed by corners 216 of gates 112 and/or corners 716 of gates 712 during molding.

Figure 13:
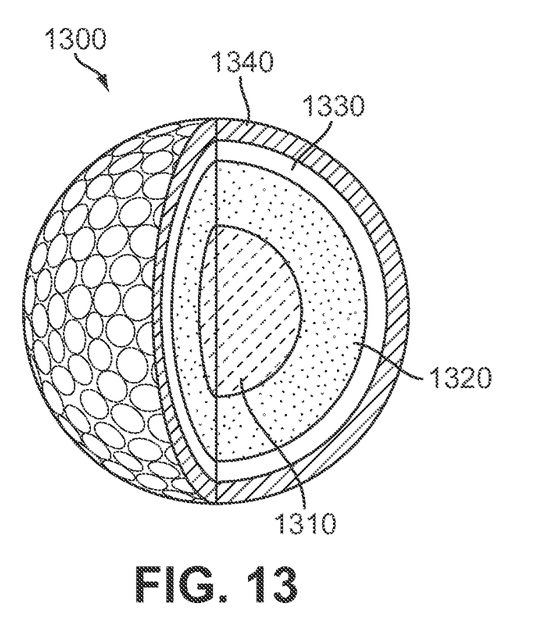
FIG. 13 shows an exemplary golf ball made by the disclosed method.

FIG. 13 shows an exemplary golf ball 1300 made by the disclosed method, which is described in detail below. Golf ball 1300 may include an inner core layer 1310, an outer core layer 1320 substantially surrounding inner core layer 1310, an inner cover layer 1330 substantially surrounding outer core layer 1320, and an outer cover layer 1340 substantially surrounding inner cover layer 1330.

As used herein, unless otherwise stated, compression deformation, hardness, COR, flexural modulus, and Vicat softening temperature are measured as follows:

A. Compression deformation: The compression deformation herein indicates the deformation amount of the ball under a force; specifically, when the force is increased to become 130 kg from 10 kg, the deformation amount of the ball under the force of 130 kg subtracts the deformation amount of the ball under the force of 10 kg to become the compression deformation value of the ball.

B. Hardness: Hardness of golf ball layer is measured generally in accordance with ASTM D-2240, but measured on the land area of a curved surface of a molded ball.

C. Method of measuring COR: A golf ball for test is fired by an air cannon at an initial velocity of 40 m/sec, and a speed monitoring device is located over a distance of 0.6 to 0.9 meters from the cannon. When striking a steel plate positioned about 1.2 meters away from the air cannon, the golf ball rebounds through the speed-monitoring device. The return velocity divided by the initial velocity is the COR.

D. Flexural modulus: Measured in accordance with ASTM D-790.

E. Vicat softening temperature: Measured in accordance with ASTM D-1525.

In some embodiments, cover layer 1310 may include a thermoplastic polyurethane. The thermoplastic polyurethane may be a crosslinked thermoplastic polyurethane elastomer. The crosslinked thermoplastic polyurethane elastomer may include crosslinks formed from allyl ether side groups. In some embodiments, the crosslinked thermoplastic polyurethane elastomer may be the product of reacting an organic isocyanate with a mixture of the following reactants:

(a) an unsaturated diol chain extender, wherein the unsaturated diol chain extender has two primary hydroxyl groups and at least one allyl ether side group, of the formula in which R is alkyl group with or without modified functional groups, and x and y are integers of 1 to 4;

(b) a secondary chain extender, having at least two reaction sites with isocyanates and having a molecular weight of less than about 450;

(c) a long chain polyol having a molecular weight ranging from about 500 to about 4,000; and (d) a sufficient amount of free radical initiator, so as to be capable of generating free radicals that induce crosslinking structures in the hard segments by free radical initiation.

The unsaturated diol chain extender may generally be any diol having at least one unsaturated bond. As is generally known, an unsaturated bond may be a double bond between two carbon atoms (as in an alkene) or a triple bond (as in an alkyne). In some embodiments, the unsaturated diol chain extender may have two primary alcohol groups. The presence of two primary alcohol groups may result in favorable reaction kinetics, such that the crosslinked thermoplastic polyurethane may be formed in an easily controlled "one step" continuous process.

In some embodiments, the unsaturated diol chain extender may have two primary hydroxyl groups and at least one allyl ether side group, so as to be of the formula:

in which R is alkyl group with or without modified functional groups, and x and y are integers of 1 to 4. In some embodiments, x and y may both have values of 1, 2, 3 or 4. In other embodiments, x and y may each have different values of between 1 and 4.

In some embodiments, the unsaturated diol chain extender may be trimethylolpropane monoallylether ("TMPME"). TMPME may also be named "trimethylol propane monoallyl ether", "trimethylol propane monoallylether", or "trimethylolpropane monoallyl ether." TMPME has CAS no. 682-11-1. TMPME may also be referred to as 1,3-Propanediol, 2-ethyl-2-[(2-propen-1-yloxy)methyl] or as 2-allyloxymethyl-2-ethyl-1,3-propanediol. TMPME is commercially available from Perstorp Specialty Chemicals AB.

Outer cover layer 1340 may have a surface Shore D hardness ranging from about 45 to about 60 or from 45 to 55. Outer cover layer 1340 may have a flexural modulus ranging from about 200 psi to about 1,000 psi.

In some embodiments, inner cover layer 1330 may include a thermoplastic material. The thermoplastic material of inner cover layer 1330 may include at least one of an ionomer resin, a highly neutralized acid polymer composition, a polyamide resin, a polyurethane resin, a polyester resin, and a combination thereof.

In some embodiments, inner cover layer 1330 may have a thickness of less than about 2 millimeters. In some embodiments, inner cover layer 1330 may have a thickness of less than about 1.5 millimeters. In some embodiments, inner cover layer 1330 may have a thickness of less than about 1 millimeter. In some embodiments, inner cover layer 1330 may be relatively thin compared to the rest of the layers of golf ball 1300, yet it may also have the highest surface Shore D hardness among all layers. In some embodiments, inner cover layer 1330 may have a surface Shore D hardness of at least about 65 as measured on the curved surface. Also, inner cover layer 1330 may have a high flexural modulus ranging from about 60,000 psi to about 100,000 psi, or from about 70,000 psi to about 85,000 psi. In some embodiments, the specific gravity of inner cover layer 1330 may range from about 1.05 $g/mm^2$ to about 1.5 $g/mm^2$ to create a greater moment of inertia.

In some embodiments, the material making up outer core layer 1320 may be a thermoset rubber. Outer core layer 1320 may be made by crosslinking a polybutadiene rubber composition. In some embodiments, when other rubber is used in combination with a polybutadiene, polybutadiene may be the principal component. For example, a proportion of polybutadiene in the entire base rubber may be equal to or greater than 50% by weight. In another example, a proportion of polybutadiene in the entire base rubber may be equal to or greater than 80% by weight. In some embodiments, outer core layer 1320 may have a surface Shore D hardness ranging from about 45 to about 65 or from about 50 to about 60. In some embodiments, outer core layer 1320 may have a surface Shore D hardness that is higher than the surface hardness of inner core layer 1310 by at least about 5 or by at least about 10. Outer core layer 1320 may have a thickness ranging from about 4 mm to about 9 mm.

Inner core layer 1310 may have a COR value ranging from about 0.79 to about 0.85. Inner core layer 1310 may have a first coefficient of restitution, and golf ball 1300 may have a second coefficient of restitution, and the first coefficient of restitution may be higher than the second coefficient of restitution by at least about 0.01. Golf ball 1300 may have a coefficient of restitution ranging from about 0.77 to about 0.81.

Inner core layer 1310 may include a thermoplastic material. For example, inner core layer 1310 may include a highly neutralized acid polymer composition. The highly neutralized acid polymer composition may have a Vicat softening temperature ranging from about 50° C. to about 60° C. In some embodiments, the highly neutralized acid polymer composition may include HPF resins such as HPF1000, HPF2000, HPF AD1027, HPF AD1035, HPF AD1040, all produced by E.I. Dupont de Nemours and Company.

A diameter of inner core layer 1310 may range from about 21 mm to about 30 mm. Inner core layer 1310 may have a surface Shore D hardness ranging from about 45 to about 55. To have a lower ball spin rate, inner core layer 1310 may have a compression deformation ranging from about 3 mm to 5 mm.

Figure 14:
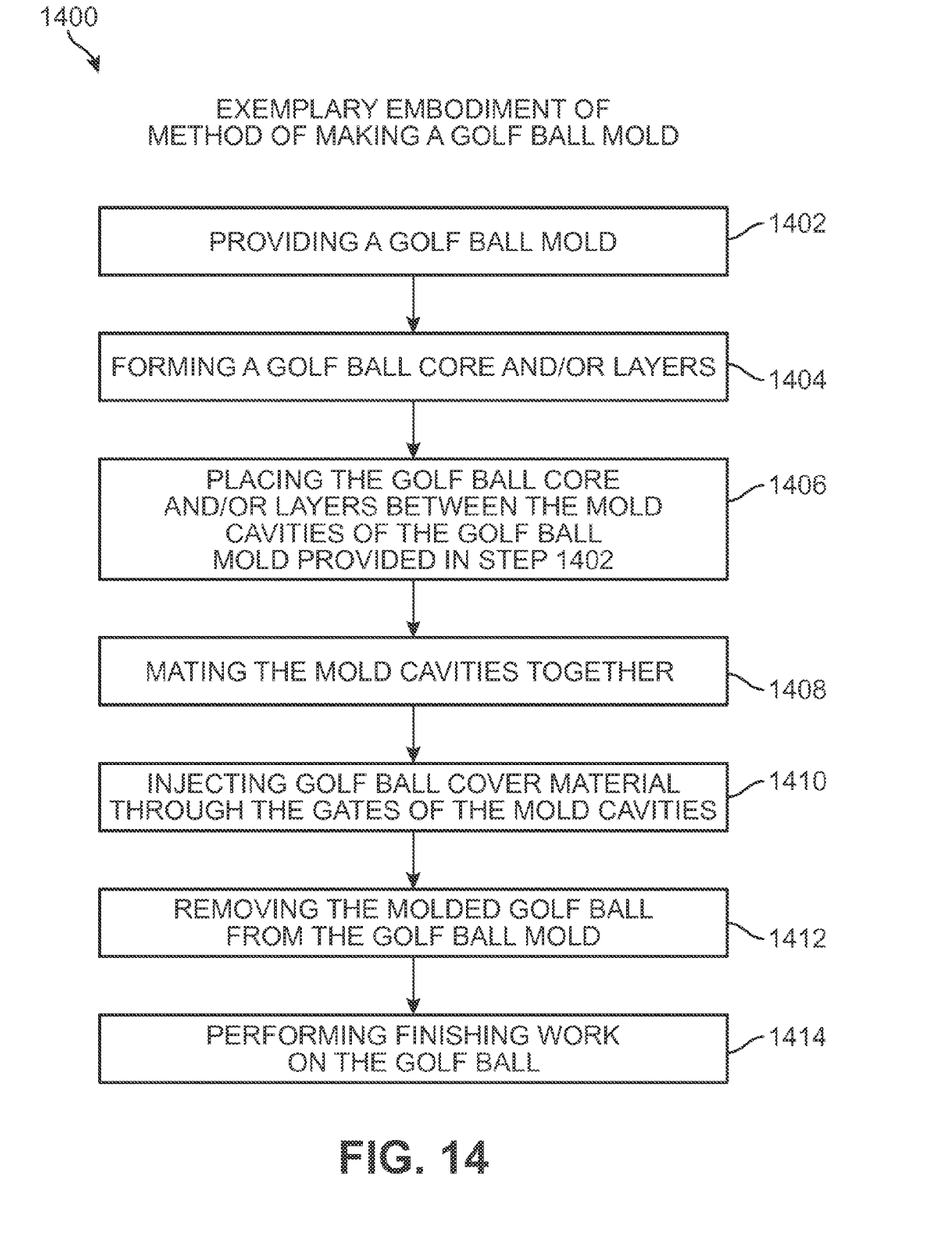
FIG. 14 shows an exemplary embodiment of a method of making a golf ball.

FIG. 14 shows an exemplary embodiment of a method 1400 of making a golf ball. Method 1400 may include a step 1402 of providing a golf ball mold consistent with this disclosure. For example, in some embodiments, the method of making a golf ball may include a step of providing a golf ball mold (shown in FIGS. 1-7 and discussed above.) In some embodiments, step 1404 may include forming a golf ball core and/or layers. As stated above, golf balls within the scope of this disclosure may be of a two-piece construction, or may have additional intermediate layers between the core and cover layer. Thus, in some embodiments, step 1404 may include only forming a single core. In other embodiments, step 1404 may include forming an inner core layer and an outer core layer. In some embodiments, step 1404 may include forming an inner core layer, an outer core layer, a mantle layer, and/or one or more inner cover layers.

In some embodiments, forming a single core or an inner core layer may include injection molding core material into a substantially spherical shape. In some embodiments, an outer core layer may be formed by compression molding outer core material around the inner core layer. Suitable vulcanization conditions may include a vulcanization temperature of between about 130° C. and about 190° C., and a vulcanization time of between 5 and 20 minutes. To obtain the desired rubber crosslinked body for use as the outer core layer, the vulcanizing temperature may be at least about 140° C.

In some embodiments, the vulcanization step may be divided into two stages: first, the outer core layer material may be placed in an outer core layer-forming mold and subjected to initial vulcanization so as to produce a pair of semi-vulcanized hemispherical cups. Then, a prefabricated inner core layer may be placed in one of the hemispherical cups and may be covered by the other hemispherical cup, in which state complete vulcanization may be carried out. The surface of the inner core layer may be roughened before the placement inside the hemispherical cup to increase adhesion between the inner core layer and the outer core layer.

In some embodiments, an inner core layer may be formed by injection molding inner core material. In some embodiments, the inner core layer surface may be pre-coated with an adhesive or pre-treated with chemical(s) before molding the outer core layer to enhance the durability of the golf ball and enable a high rebound.

In some embodiments, step 1406 may include placing the golf ball core and/or layers between the mold cavities of the golf ball mold provided in step 1402. In some embodiments, step 1406 may include placing a golf ball core between the two complimentary mold cavities. In embodiments where a single mold cavity has multiple mold chambers, step 1406 may include placing multiple golf ball cores between the corresponding mold chambers to mold multiple golf ball cover layers simultaneously. In embodiments where the golf ball mold is made up of more than two mold cavities, a core may be placed between the mold cavities such that the mold cavities can enclose the core.

In some embodiments, step 1408 may include mating the mold cavities together to enclose the mold chambers around the golf ball core(s) and/or cover layers. In some embodiments, step 1410 may include injecting golf ball cover layer material into the gates of the mold cavities. In some embodiments, step 1410 may include injecting golf ball cover layer material into the ports and gates of the mold cavities. In some embodiments, the golf ball cover layer material being injected during step 1410 may include any of the materials discussed above.

In some embodiments, step 1412 may include removing the molded golf ball from the golf ball mold. In some embodiments, step 1414 may include removing excess golf ball cover layer material from the golf ball. For example, the golf ball may include a ring runner and/or gate runners caused by golf ball cover material left in the gates and in between the parting edges during the molding process.

It is understood that any of the steps disclosed above may be performed in any order. For example, step 1402 may be performed at the same time as step 1404. In another example, step 1404 may be performed before step 1402.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of making a golf ball that reduces the gate mark defect rate, comprising:
   providing a golf ball mold including a first mold cavity and a second mold cavity configured to mate with the first mold cavity,
   the first mold cavity having a first mold chamber and a first parting edge disposed along the perimeter of the first mold chamber wherein a first gate is disposed along the first parting edge,
   the second mold cavity having a second mold chamber and a second parting edge disposed along the perimeter of the second mold chamber, wherein the first mold cavity and the second mold cavity mate at the first parting edge and the second parting edge;
   wherein the first gate has a flat middle surface connected by a first side surface and a second side surface disposed opposite the first side surface, and wherein the middle surface, first side surface, and second side surface together form a substantially u-shaped cross-section,
   the first gate providing a path having a substantially rectangular cross-section for a cover material to be injected into the first mold chamber and having a first edge forming a first round between the first parting edge and the first mold chamber, wherein the substantially rectangular cross-section has as three sides the first side surface, the second side surface, and the flat middle surface and has as one side a portion of the second parting edge, wherein the first round includes a radius of curvature ranging from about 0.2 mm to about 0.5 mm;

forming a golf ball core;
placing the golf ball core between the first mold cavity and the second mold cavity;
mating the first mold cavity and the second mold cavity together; and
injecting a golf ball cover material into the first mold cavity and the second mold cavity.

2. The method of making a golf ball according to claim 1, wherein the step of injecting a golf ball cover material into the first mold cavity and the second mold cavity includes injecting the golf ball cover material through the first gate of the first mold cavity.

3. The method of making a golf ball according to claim 1, wherein the path has a cross-sectional area ranging from about 0.3 mm$^2$ to about 2 mm$^2$.

4. The method of making a golf ball according to claim 1, wherein the substantially rectangular cross-section has a vertical height ranging from about 0.3 mm to about 1.5 mm.

5. The method of making a golf ball according to claim 1, wherein the cross-section of the first gate includes at least one fillet.

6. The method of making a golf ball according to claim 5, wherein the at least one fillet includes a radius of curvature ranging from about 0.2 mm to about 0.5 mm.

7. The method of making a golf ball according to claim 1, wherein the golf ball cover material includes a thermoplastic polyurethane.

8. The method of making a golf ball according to 7, wherein the golf ball cover material includes a crosslinked thermoplastic polyurethane elastomer.

9. The method of making a golf ball according to claim 1, further comprising forming an inner cover layer enclosing the core, wherein the inner cover layer has a surface Shore D hardness of at least 65.

10. The method of making a golf ball according to claim 1, wherein forming a golf ball core includes injection molding an inner core layer and compression molding an outer core layer around the inner core layer, wherein the inner core layer comprises a highly neutralized acid polymer composition.

11. The method of making a golf ball according to claim 1, wherein a second gate is disposed along the second parting edge, wherein the second gate has a second gate flat middle surface connected by a second gate first side surface and a second gate second side surface disposed opposite the second gate first side surface, and wherein the second gate middle surface, the second gate first side surface, and the second gate second side surface together form a substantially u-shaped cross-section of the second gate and together with a portion of the first parting edge as one side provide a substantially rectangular path for a cover material to be injected into the second mold chamber and further wherein the second gate has a second edge forming a second round between the second edge and the second mold chamber.

12. The method of making a golf ball according to claim 11, wherein the golf ball mold includes 9 substantially u-shaped gates along the first parting edge, wherein the 9 gates together with portions of the second parting edge provide 9 substantially rectangular paths and the golf ball mold includes 9 substantially u-shaped gates along the second parting edge, wherein the 9 gates together with portions of the first parting edge provide 9 substantially rectangular paths.

13. A method of making a golf ball, comprising:
providing a golf ball mold including a first mold cavity having a first mold chamber including a first parting edge disposed along the perimeter of the first mold chamber and a first gate having a substantially u-shaped cross-section disposed along the first parting edge, the golf ball mold further including a second mold cavity having a second mold chamber including a second parting edge disposed along the perimeter of the second mold chamber and a second gate disposed along the second parting edge, wherein the second parting edge has a shape corresponding to the first parting edge such that the first mold cavity may be mated with the second mold cavity, wherein the u-shaped cross-section of the first gate and the second gate is substantially rectangular and has a height of from about 0.3 mm to about 1.0 mm and a width of from about 1.5 mm to 2.5 mm and curved edges opening into the mold that have radius of curvature of 0.2 to 0.5 mm;
forming a golf ball core, the golf ball core comprising a thermoplastic material;
placing the golf ball core between the first mold cavity and the second mold cavity;
mating the first parting edge with the second parting edge such that the first gate aligns with a portion of the second parting edge to provide a substantially rectangular cross-section first path having as one side a portion of the second parting edge for a cover material to be injected into the first mold cavity and the second mold cavity and the second gate aligns with a portion of first parting edge to provide a second path for the cover material to be injected into the first mold cavity and the second mold cavity; and
injecting a golf ball cover material having a flexural modulus of from 200 psi to 1,000 psi into the first mold cavity and the second mold cavity.

14. The method of making a golf ball according to claim 13, wherein injecting a golf ball cover material into the first mold cavity and the second mold cavity includes injecting the golf ball cover material through the first gate and the second gate.

15. The method of making a golf ball according to claim 13, wherein the second path has a substantially u-shaped cross-section that, when the first parting edge and the second parting edge are mated, forms a path having a substantially rectangular cross-section having as one side a portion of the first parting edge.

16. The method of making a golf ball according to claim 13, wherein the first path is vertically offset from the second path.

17. A method of making a golf ball that reduces the gate mark defect rate, comprising:
providing a golf ball mold including a first mold cavity having a first mold chamber including a first parting edge disposed along the perimeter of the first mold chamber and a first gate disposed along the first parting edge and a second mold cavity having a second mold chamber and a second parting edge disposed along the perimeter of the second mold chamber, wherein the first gate has a first edge forming a first round between the first parting edge and the first mold chamber, the first round includes a radius of curvature ranging from about 0.2 mm to about 0.5 mm; and wherein the first parting edge and the second parting edge both have wavy surfaces that correspond such that the first mold cavity may be mated with the second mold cavity along the first parting surface and the second parting surface such that the first gate provides a first path having a substantially rectangular cross-section with a portion of the second parting edge as one side of the rectangular cross-section for a cover material to be injected into the first mold having a first mold chamber; the golf ball mold further including a second gate disposed along the second parting edge;

forming a golf ball core;

placing the golf ball core between the first mold cavity and the second mold cavity;

mating the first mold cavity and the second mold cavity together; and injecting a golf ball cover material into the first mold cavity and the second mold cavity.

18. The method of making a golf ball according to claim 17, wherein when the first parting edge mates with the second parting edge, the first gate aligns with a portion of second parting edge to provide a first path for a cover material to be injected into the first mold chamber, and wherein the portion of the second parting edge that aligns with the first gate is concave such that the portion of the second parting edge bows outwardly away from the first gate.

19. The method of making a golf ball according to claim 17, wherein the path has a cross-sectional area ranging from about 0.3 mm² to about 2 mm².

20. The method of making a golf ball according to claim 17, wherein the substantially rectangular cross-section has a vertical height ranging from about 0.3 mm to about 1.5 mm.

21. The method of making a golf ball according to claim 17, wherein forming a golf ball core includes compression molding an outer core layer around the inner core layer, and the outer core layer has a surface Shore D hardness that is higher than the surface hardness of the inner core layer by at least about 5.

22. The method of making a golf ball according to claim 18, wherein the golf ball mold includes 9 gates along the first parting edge, wherein the 9 gates together with portions of the second parting edge provide 9 substantially rectangular paths and; the golf ball mold includes 9 gates along the second parting edge, wherein the 9 gates together with portions of the first parting edge provide 9 substantially rectangular paths when mating the first mold cavity and the second mold cavity together.

\* \* \* \* \*